United States Patent [19]

Hofstetter et al.

[11] Patent Number: 5,216,669
[45] Date of Patent: Jun. 1, 1993

[54] METHOD FOR SETTING UP VIRTUAL CONNECTIONS IN SWITCHING EQUIPMENT OPERATING ACCORDING TO AN ASYNCHRONOUS TRANSFER MODE

[75] Inventors: Helga Hofstetter; Eugen Wallmeier, both of Munich, Fed. Rep. of Germany

[73] Assignee: Siemens Aktiengesellschaft, Munich, Fed. Rep. of Germany

[21] Appl. No.: 664,796

[22] Filed: Mar. 5, 1991

[30] Foreign Application Priority Data

Mar. 23, 1990 [DE] Fed. Rep. of Germany ....... 4009423

[51] Int. Cl.$^5$ .............................................. H04J 3/22
[52] U.S. Cl. ...................................... 370/84; 370/94.1
[58] Field of Search ...................... 370/84, 79, 91, 65, 370/54, 60, 94.1, 94.2, 60.1, 110.1

[56] References Cited

U.S. PATENT DOCUMENTS

| | | | |
|---|---|---|---|
| 4,704,606 | 11/1987 | Hasley | 370/82 |
| 4,884,266 | 11/1989 | Pflaumer | 370/84 |
| 4,984,264 | 1/1991 | Katsube | 370/60 |
| 4,993,024 | 2/1991 | Quinquis et al. | 370/84 |
| 5,016,245 | 5/1991 | Lobjinski et al. | 370/60 |
| 5,067,123 | 11/1991 | Hyodo et al. | 370/94.1 |
| 5,081,620 | 1/1992 | Girard et al. | 370/60 |
| 5,117,417 | 5/1992 | Danner | 370/94.1 |

FOREIGN PATENT DOCUMENTS

| | | |
|---|---|---|
| 0343611 | 11/1989 | European Pat. Off. . |
| 3732937A1 | 4/1989 | Fed. Rep. of Germany . |

OTHER PUBLICATIONS

Conference Paper from the International Switching Symposium, 15-20 Mar. 1987, Proceedings, Phoenix, USA, 3 (1987), "Realization of Broadband ISDN in a Modern System Structure" H. Bauch et al, pp. 602-608.
International Journal of Digital and Analog Cabled Systems, vol. 1, 1988, "Considerations on ATM Switching Techniques", K. A. Lutz, pp. 237-243.
Nachrichteutsch, Elektron., Berlin 39 (1989), "Asynchroner Transfermodus–Ein Neuer Weg Zum Breitband–ISDN", P. R. Gerke, pp. 3 and 4.
Research by Johathan S. Turner, Washington University, St. Louis, Missouri entitled "New Directions in Communications", pp. 25-32.
IEEE Infocom '89—Apr., 1989—pp. 701-710—Alexander Gersht et al "A Congestion Control Framework for ATM Networks".
IEEE International Conference on Communications, ICC '89, Jun. 1989, pp. 415-522—P. Joos et al, "A Statistical Bandwidth Allocation and Usage Monitoring Algorithm for ATM Networks".

Primary Examiner—Douglas W. Olms
Assistant Examiner—Shick Hom
Attorney, Agent, or Firm—Hill, Steadman & Simpson

[57] ABSTRACT

For route searching in a multi-stage ATM switching matrix network, the free transmission capacities of ATM links are individually stored with an occupation memory. For setting up new virtual connections, a required transmission capacity is reported. Based on the extent thereof, a route selection occurs only via ATM links having free transmission capacity that is momentarily adequate. Bit rate classes are formed for storing the free transmission capacity. The required transmission capacities are also classified therein. For a respective ATM link group that is connected to an ATM switching element at the output side and/or input side, link-associated storage locations are binarily identified in storage cells of the occupation memory provided per bit rate class when transmission capacity corresponding to the allocated bit rate class is still respectively freely available. Presence of coincidence in view of the binary identification established for the respective bit rate class is checked in the route searching.

7 Claims, 1 Drawing Sheet

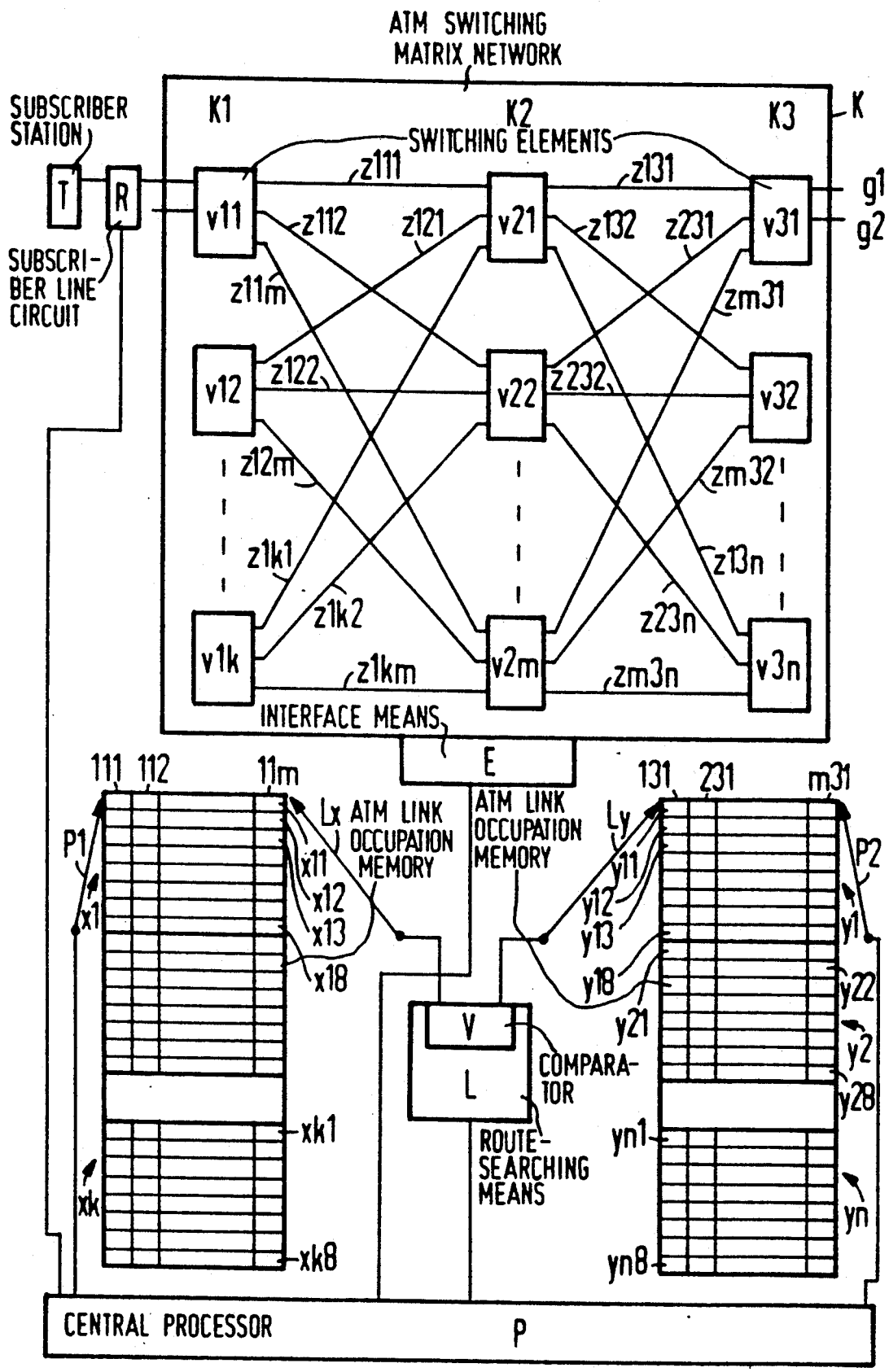

METHOD FOR SETTING UP VIRTUAL CONNECTIONS IN SWITCHING EQUIPMENT OPERATING ACCORDING TO AN ASYNCHRONOUS TRANSFER MODE

BACKGROUND OF THE INVENTION

The invention is directed to a method for setting up virtual connections in switching equipment operating according to an asynchronous transfer mode.

Methods of this type are already known from the periodical INTERNATIONAL JOURNAL OF DIGITAL AND ANALOG CABLED SYSTEMS, Vol. 1, an article by K. A. Lutz on pages 237-243 (1988) and from the Conference Paper from the International Switching Symposium, 15 through Mar. 20, 1987, Proceedings, Phoenix, USA, Bouch, K. Brüninghaus, and B. Schaffer 3(1987), pages 602-608, both incorporated herein by reference. Virtual connections are set up for packet switching with methods of the known type. For this purpose, routes sought via links as well as via ATM (Asynchronous Transfer Mode)—switching matrix networks, are selected and defined. Routes via ATM switching elements and via ATM links are defined within an ATM switching matrix network.

It is important when seeking, selecting, and defining routes (route search) for virtual connections to be newly set up that routes already occupied by virtual connections can be made use of for other virtual connections, insofar as free transmission capacity is still available on these routes. For this purpose, it is known—for example for every link in a multi-stage ATM switching matrix network—to store the transmission capacity that is respectively free at the moment, i.e. is available for setting up new virtual connections, in an ATM link occupation memory. This transmission capacity that is still free, i.e. is still respectively available for setting up new virtual connections, can, for example, be equal to the difference between the overall transmission capacity of a link and the transmission capacity already made use of by the virtual connections set up thereover. The latter, for example, can be the sum of all peak bit rates of the corresponding virtual connections.

It is already known for seeking, selecting, and defining routes for virtual connections to be newly set up that the respective transmission capacity that is still free, i.e. is still available for setting up new virtual connections, is compared in terms of size to the transmission capacity required for the new virtual connection to be set up, which, for example, may correspond to the peak bit rate of this virtual connection.

The invention is directed to simplifying the procedure of route searching to be very frequently sequenced in methods of the type initially discussed. When a size comparison of the type addressed above is then carried out for every route search, then particularly strict demands for the corresponding processing equipment result therefrom, namely because the operations of setting up new virtual connections, on the one hand, are many per time unit, i.e. occur relatively frequently and, on the other hand, dare not last too long. Waiting time problems when setting up connections are disturbing and undesirable.

SUMMARY OF THE INVENTION

It is an object of the invention to specify suitable techniques for a method of the type initially cited with the assistance of which the seeking, selection, and definition of routes (route search) for virtual connections to be newly set up can be sequenced as simply as possible. The processing events should be designed such that all events that are to be sequenced immediately before every new virtual connection and for every piece of equipment are optimally simplified.

According to the invention, a method is provided for setting up virtual connections in ATM switching equipment operating according to an asynchronous transfer mode. A multi-stage ATM switching matrix network is provided having a plurality of switching matrix stages each having a plurality of ATM switching elements. ATM links lead from switching matrix stage to switching matrix stage. The ATM switching elements connect successive switching matrix stages to one another. Bit rate limit values are defined in call-associated fashion for individual virtual connections by storing appropriate data. An ATM link occupation memory is provided for set-up of new virtual connections by selecting call-associated roots, free bit rate transmission capacities which are still available being individually stored for the ATM links. Acceptability of the set-up of new virtual connections with respect to each and every one of the ATM links coming into consideration for these connections is checked by use of the bit rate limit values defined for the new virtual connections and by use of the free bit rate transmission capacity that is still respectively available on the corresponding ATM links. The virtual connections are allocated to connection bit rate classes referring to dimensional ranges of the bit rate limit values. The free bit rate transmission capacities still respectively available on the ATM links are allocated to transmission bit rate classes having corresponding transmission bit rate limit values. ATM links respectively exiting from one of the ATM switching elements and/or leading to such an ATM switching element are combined into an ATM link group. A family of storage cells each having a respective plurality of storage locations is reserved in the ATM link occupation memory for each of the ATM link groups. Each of the storage cells is allocated to a defined connection bit rate class or transmission bit rate class, and within the respective storage cell, each of the storage locations is allocated to one of the ATM links connected to the respective ATM switching element. The individual storage locations of a storage cell are marked in binary fashion given a presence of a free transmission capacity on the allocated ATM link for the transmission bit rate class allocated to the respective storage cell. For setting up a new virtual connection via a plurality of ATM links corresponding in number to the plurality of switching matrix stages, a storage cell corresponding to the connection bit rate class allocated to the new virtual connection is selected for every one of the ATM link groups coming into consideration. On the basis of an interrogation event of the individual storage locations identically identified with respect to the sequence within the storage cells just being driven, those ATM links whose allocated storage locations have a coincidency with respect to their binary identification are selected for the new virtual connection.

As a result of the invention, the size comparisons between available transmission capacities and required transmission capacities are reduced to simple one-bit comparisons. The route search for virtual connections to be newly set up is thus quite significantly simplified, this being of particular significance for virtual connections via ATM switching matrix networks having a plurality of switching matrix stages and, accordingly, via various groups of ATM links. These groups lie at different locations between the successive switching matrix stages in the ATM switching matrix network. Connection bit rate classes are then formed for this purpose. Respectively proceeding from the connection bit rate class applying to the virtual connection to be newly set up, a route search makes use of the various memory elements corresponding to this connection bit rate class, and on the basis of simple one-bit comparisons, identifies the ATM links that are respectively usable for the new virtual connection to be set up.

BRIEF DESCRIPTION OF THE DRAWINGS

The drawing shows an ATM switching equipment system operating in an asynchronous transfer mode, and which operates according to the invention.

DESCRIPTION OF THE PREFERRED EMBODIMENTS

As an exemplary embodiment, the drawing shows switching equipment wherein the invention is employed. Only those component parts serving for an understanding of the instant invention are thus shown for this switching equipment.

An ATM switching matrix network K (referred to below as a "switching matrix network" for purposes of simplification) of ATM switching equipment contains ATM switching elements v11 through v3n (referred to below only as "switching element" or, respectively, "switching elements") in three switching matrix stages K1 through K3. These switching elements are connected to one another via links Z111 through Zm3n in the illustrated way. ATM switching equipment in communication equipment having the asynchronous transfer mode (ATM) is already known from extensive technical literature, a few exemplary examples thereof being referenced: "International Zuerich Seminar on Digital Communications", (March 1986) with the publication "New Directions in Communications" (Section A3.1 through A3.8 by J. B. Turner); German Published Application 3 732 937; European Patent Application 89102172.7; Periodical "Nachrichtentechnik, Elektronik," Berlin, 39 (1989)1, pages 3 and 4, all incorporated herein by reference.

The switching equipment shown in the drawing is thus a switching arrangement for communication equipment having the asynchronous transfer mode. Virtual connections are set up via the multi-stage switching matrix network K. For this purpose, ATM links z111 through zm3n lead from switching matrix stage to switching matrix stage. They connect the switching matrices v11 through v3n of the three successive switching matrix stages K1 through K3 to one another. For virtual connections that, as is known, serve the purpose of packet-switched transmission of data and messages, call-associated routes are sought, selected, and defined. By contrast to PCM connections and conventionally voltaically through-connected connections, as is known these virtual connections are not provided in such fashion that a connecting path (this can thus be a path that is voltaically through-connected or through-connected in time-division multiplex) can be exclusively used for only one connection; rather, virtual connections are of such a nature that information in the form of message packets (cells) are communicated with them, that these packets (cells) are identified with a header, and that all packets (cells) of a virtual connection respectively follow the same route across the switching matrix network and links in the network that was selected during set-up. Message packets or data packets to be communicated via virtual connections are communicated packet-by-packet. Accordingly, further data packets, namely different virtual connections, are communicated chronologically between the data packets to be communicated for the corresponding virtual connection being communicated via the corresponding connecting paths, for example transmission channels of transmission systems and links. As is known, however, virtual connections are exactly defined in terms of route. Corresponding route searching and selection means serve this purpose in the corresponding switching centers.

What, among other things, is thus involved when setting up virtual connections via ATM switching equipment is that only so many virtual connections can be conducted via corresponding ATM connecting paths (for example ATM links), in view of the given transmission capacity. For this purpose, call-associated bit rate limit values for virtual connections in ATM switching equipment are defined by storing appropriate data. These bit rate limit values, for example, can be the peak bit rates of the corresponding virtual connections. When a subscriber wishes the set-up of a new virtual connection, then he indicates the peak bit rate with which he intends to transmit (messages, data, and the like). During transmission of data packets, he fundamentally dares not exceed this peak bit rate. In a first ATM switching center in which data packets transmitted by the corresponding subscriber arrive, constant monitoring is carried out to see whether the incoming ATM message stream observes or exceeds the rate values announced by the corresponding subscriber in view of the peak bit rate; corresponding counter-measures are initiated in the switching center given an upward transgression. This can be comprised therein that parts of the message packets are suppressed, i.e. are not transmitted at all or are transmitted in truncated fashion; and/or in that a corresponding signalling is transmitted to the corresponding subscriber, or that a virtual connection is forcibly interrupted. Furthermore, an appropriate counter-measure can also be comprised in initially only marking the corresponding packets and then discarding them when the load situation in the network in fact requires this. This counter-measure thus means that there can also be exceptions in the above transgression rule that can be allowed when the load situation in the network allows it.

In addition to the peak bit rate, a mean bit rate (average over a longer time, for example over a time interval of a few minutes) can also serve as a criterion for the transmission capacity announced by a subscriber when transmitting data packets and to be observed during the existence of the corresponding, virtual connection. The peak bit rate as well as the mean bit rate together can also serve as a criterion. European Patent Application 90122430.3, incorporated herein by reference, is referenced in this context.

As was already mentioned, the required peak bit rate as well as the mean bit rate are reported by a subscriber when setting up a virtual connection. These rate values are defined by appropriate storage in the ATM switching equipment reached first by the message stream of this subscriber. Appropriate data are thus stored in this switching equipment allocated to the corresponding, virtual connection. When sending packet-switched messages, the corresponding subscriber dare not exceed this peak bit rate and this mean bit rate. For this purpose, thus call-associated bit rate limit values are defined in the ATM switching equipment by storing corresponding data (peak bit rate and/or mean bit rate).

As was already indicated, routes are sought, selected and defined in call-associated fashion with a route searching and selecting means when setting up new virtual connections. The acceptability of the set up of new virtual connections with respect to each and every one of the ATM links respectively coming into consideration for such a set-up is thus checked with reference to the bit rate limit values defined in call-associated fashion for the corresponding new virtual connections. This check is carried out taking the free bit rate transmission capacities respectively still available on the corresponding ATM links into consideration. ATM links initially fundamentally come into consideration or not for new virtual connections based on the structure technique of the corresponding switching matrix network. For a virtual connection in the switching matrix network K that is intended to proceed via the switching matrices v11 and v32, only the links z111 through z11m and z132 through zm32 come into consideration. The other links do not come into consideration because—as is already seen in terms of the switching matrix network structure—they are obviously not suitable for the corresponding virtual connection. Of those links coming into consideration for setting up a new virtual connection, all are subsequently checked to see whether the required transmission capacity is still present on each and every one of them. Let it then be assumed that this transmission capacity is no longer present on the ATM links z111 and z232 in the exemplary case under consideration. In this case, the new virtual connection cannot be set up via the ATM links z111/z132/z112/z232. The desired virtual connection, however, can be set up via the ATM links z11m and zm32. To this extent, it can thus be seen that a coincidence condition must be satisfied in view of the transmission capacity that is still respectively available. This coincidence condition is of critical significance for the route searching. A check must thus be carried out to see whether this coincidence condition is respectively met.

The exemplary embodiment of an ATM switching equipment contains only a three-stage switching matrix network. The analogous case, however, is also valid for four-stage switching matrix networks and multi-stage switching matrix networks going beyond this.

Among the things shown in the drawing are an ATM link occupation memory that is composed of the memory parts x1 through xk and y1 through yn. The free bit rate transmission capacities still respectively available on the ATM links of the switching matrix network K are stored in link-associated fashion with the assistance of this occupation memory. These stored capacities are utilized for the check already set forth earlier. Thus, the acceptability of the set-up of new virtual connections with respect to each and every one of the ATM links coming into consideration for them is checked with reference to the bit rate limit values respectively defined for the corresponding, new virtual connections, and with reference to the free bit rate transmission capacity that is still respectively available on the corresponding ATM links.

It is then provided that the virtual connections, which have an unlimited number of different possible bit rate limit values, are combined in connection bit rate classes that are significantly fewer in comparison thereto and refer to dimensional ranges of the bit rate limit values. The virtual connections, of course, are initially requested by subscribers with the assistance of selection information they output. The bit rate limit values they desire are thus subscriber-associated. It follows therefrom that the number of different, possible bit rate limit values is, of course, initially unlimited. Insofar as the respective terminal equipment technologically allows it, the subscribers can freely select the mean bit rate and the peak bit rate with which they intend to transmit.

When, given the request for a new virtual connection on the basis of subscriber signalling (dialing), the bit rate limit values freely selected by the subscriber or defined by the respectively existing terminal equipment arrive, then these are first allocated to dimensional ranges of the bit rate limit values. This applies both to the mean bit rate as well as to the peak bit rate. The relationship between mean bit rate and peak bit rate is thus also not defined. Connection requests can be specified wherein the corresponding subscriber would like to transmit in extremely steady fashion. In this case, the peak bit rate he specifies is no higher than or only slightly higher than the mean bit rate he specifies. In another instance, there can also be call requests wherein a subscriber only intends to transmit in extremely sporadic fashion during the existence of a virtual connection he has requested. In this case, he specifies what is only a relatively low, mean bit rate, by contrast whereto the peak bit rate that he has made use of can be quite, significantly higher. The bit rate limit values specified by the subscribers are thus then allocated to defined dimensional ranges of the bit rate values. These dimensional ranges relate both to the limit values of the mean bit rate as well as to the limit values of the peak bit rate.

Connection bit rate classes are now formed which are identified by different dimensional ranges of the bit rate limit values. A connection bit rate class is characterized by a dimensional range with respect to the mean bit rate and by a different dimensional range with respect to the peak bit rate. The different connection bit rate classes can also be in part characterized by identical dimensional ranges with respect to the mean bit rate and by different dimensional ranges in view of the peak bit rate and vice versa.

Preferably, the connection bit rate classes that differ from one another on the basis of the dimensional ranges of the bit rate limit values in the manner set forth above are numbered. On the basis of the numbering of a connection bit rate class, thus the respective dimensional range of the bit rate limit value with respect to the mean bit rate, as well as the dimensional range of the bit rate limit value in view of the peak bit rate, are thus defined.

When a subscriber at subscriber station T wishes to set up a virtual connection, then in addition to the standard selection information, he also—among other things—outputs the bit rate limit values with respect to the mean bit rate and with respect to the peak bit rate to the corresponding switching center. These limit values, for example, can be accepted in a subscriber line circuit R and can be forwarded from the latter to a central processor P that controls the set-up of the virtual connections in call-associated fashion and, among other things, accepts these two bit rate limit values and initially stores them for each desired, virtual connection.

In the same way, the free transmission capacities that are still respectively available on the ATM links are combined in transmission bit rate classes having corresponding transmission bit rate limit values. The ATM links, of course, respectively have a defined, maximum transmission capacity. Some of the transmission capacity of the corresponding ATM link is already being made use of by virtual connections already set up via an ATM link. When setting up a new virtual connection, only the remaining, free transmission capacity can then be made use of. Only this is thus available for virtual connections to be newly set up. This is quite generally valid, i.e. under the aspect of taking peak bit rates and/or mean bit rates into consideration. The ATM link occupation memory that shall be referred to below as a "route-searching memory" for purposes of simplification, serves the purpose of acquiring the transmission capacities free per ATM link in transmission bit rate classes having corresponding transmission bit rate limit values. This route-searching memory is composed of the memory parts x1 through xk and y1 through yn. The ATM links in the switching matrix network K form ATM link groups. An ATM link group always departs from a switching element, or leads to such a switching element. For example, such an ATM link group is composed of the ATM links z111 through z11m. It departs from the switching element v11. Another ATM link group, for example, is formed of the ATM links z132 through zm32. It leads to the ATM switching element v32. The analogous case applies to all other ATM links in the switching matrix network K.

At the output side, ATM trunks or corresponding subscriber lines are connected to the switching elements v31 through v3n in a known way. These lead to other ATM switching centers. Only two such ATM trunks g1 and g2 ar shown.

A family of storage cell lines, for example x11 through x18, is then provided in the route-searching memory per ATM link group, for example z111 through z11m. One respective storage cell line, for example x11, is allocated to one of the transmission bit rate classes. The size of this family is thus not dependent on the number of ATM links in an ATM link group, but is based on the number of transmission bit rate classes that are provided overall.

As may be seen from the drawing, the storage cell lines x11 through xk8 and y11 through yn8 are subdivided into columns 111 through 11m and 131 through m31. One respective storage cell (storage location) is a component part of a storage cell or row and simultaneously also respectively belongs to a defined column, for example 111.

Within each and every storage cell row, for example x11, the individual storage cells (one respective storage cell per column) are individually allocated to the links, for example z111 through z11m, connected to the respective ATM switching element, for example v11. These storage cells can be binarily signified, i.e. they can assume the logical value of zero and the logical value of one. As a result, they indicate the availability of transmission capacities with respect to the respective transmission bit rate class present on these ATM links. Let this be signified in that the respective storage cell carries the logical value of one. As a result thereof, it indicates for the allocated ATM link, for example z111, to which, of course for example the column 111 is allocated, that transmission capacity is still available on this ATM link for the respective transmission bit rate class.

As already stated, a respective storage cell row corresponds to a transmission bit rate class. As was likewise already explained above, this bit rate class can be characterized by two bit rate limit values (of the above dimensional ranges) wherein one relates to the mean bit rate and one relates to the peak bit rate. As a result of so signifying, it is thus indicated for a defined ATM link (a column corresponds thereto) whether transmission capacity is still available at this ATM link in view of the respective transmission bit rate class that is identified by defined dimensional ranges of the bit rate limit values. Thus, these bit rate limit values (as already indicated) refer, on the one hand, to the mean bit rate and, on the other hand, to the peak bit rate.

When, via his subscriber station T, a subscriber then places the order to set up a new virtual connection, then, in addition to containing the destination information (for example, subscriber telephone number), this also contains particulars about the desired, mean bit rate and about the peak bit rate. On the basis of these particulars, the desired virtual connection is allocated to the corresponding dimensional ranges based on the measure of the bit rate limit values (relating to the mean bit rate and peak bit rate); the desired connection is thus assigned to a defined connection bit rate class. For this purpose, these particulars are forwarded from the subscriber line circuit R to a processor P that, among other things, undertakes these allocations. This processor also receives the destination information (dial information) on the basis whereof it initiates the set-up of the desired virtual connection across an interface means E in the ATM switching matrix network. This occurs in a known way. During the route search itself, however, the processor proceeds in the manner of the invention.

Let it now be assumed that the destination information (for example, long-distance digit plus local area code plus subscriber telephone number) leads to a virtual connection being set up via the switching element v32. Let it be assumed that the dialing subscriber is the subscriber at the subscriber station T. The desired virtual connection is thus to be set up, among other things, across the switching element v11 (see connection between R and v11 in the drawing FIGURE). The question is now to seek a suitable route across the switching matrix network. The link groups z111 through z11m and z132 through zm32 come into consideration for this. The processor forwards an information concerning this to the route-seeking means L that has the job of seeking, selecting, and defining a suitable, free route. Up to this point, it is now already certain on the basis of the information that the route-seeking means L has received, that a corresponding free route is to be sought in the link group z111 through z11m on the one hand and z132 through zm32 on the other hand. These two link groups correspond to the two memory parts x1 and y2.

With the assistance of its read means Lx and Ly, the route-seeking means L drives the memory parts x1 and y2. The processor also informs the read means L of the bit rate class that is the determining factor for the desired virtual connection. On the basis of the information about the bit rate class and with the assistance of its read means Lx and Ly within the memory parts x1 and y2, the route-seeking means L now selects those storage cell rows within these memory parts which are assigned to the bit rate class. Among those ATM links that are coincidentally signified by a logical one in view of the succession of the columns 111 through 11m and 131 through m31, the route-seeking means L now seeks a free ATM link within the two storage cell rows. Of course, these two logical values can also be interchanged.

In the corresponding two storage rows, the two read means Lx and Ly thus progressively read the contents of the individual storage cells column-by-column progressing from left to right, namely storage cell by storage cell simultaneously in each of the two storage cell rows. Such a search sequence is referred to as one having a fixed zero position. However, a search sequence that has a progressive zero position or a zero position that changes randomly or in some other way can also be utilized. As soon as the route-seeking means L simultaneously receives a respective logical one via each of its two read means Lx and Ly, it can recognize that the transmission capacity for the desired bit rate class is still free at the corresponding two ATM links, and a new virtual connection is thus available for the equipment.

As stated, the corresponding bit rate class guarantees that a mean bit rate and a peak bit rate which correspond to the dimensional ranges of the bit rate limit values can be communicated via the corresponding virtual connection. With reference to the bit rate limit value or to the bit rate limit values (expressed by the corresponding bit rate class) applying to the virtual connection to be respectively newly set up, a storage cell is sought whose allocated transmission bit rate class corresponds to these two bit rate limit values, and thus to the desired bit rate class in view of the transmission capacity required for the new virtual connection.

One of those links whose storage cells are signified is selected within the corresponding storage cell row. This occurs in accordance with an afore-mentioned selection mode provided for the route seeking. This can provide that a selection having a fixed zero point and a constant search sequence is applied. However, other selection modes can also be applied, for example having a non-fixed zero position and/or having a non-fixed search sequence.

In the above-described way, a selection of ATM links in accordance with the storage cell rows coming into question occurs according to the invention in the various ATM link groups of non-identical switching matrix stages. This is done in dependence upon a coincidence in view of their signification existing within these storage cell rows for storage cells that correspond to one another. Storage cells corresponding to one another are thus storage cells that lie in columns having the same name, for example 112 and 231.

The description provided herein refers to switching matrix networks having in-line grouping. The corresponding case applies by analogy given employment of the invention in a switching matrix network having switching equipment comprising wraparound grouping.

It has already been pointed out that the switching matrix network can also be constructed with more than three switching matrix stages. The route search is then also to be correspondingly designed, whereby a coincidence formation is to be provided in the inventive way not only between two signified storage cells, but between correspondingly more storage cells. Instead of being defined according to the criterion of two limit values (mean bit rate and peak bit rate), the connection bit rate classes as well as the transmission bit rate classes can also be defined based on the criterion of one or more limit values.

In the present instance, eight different storage cell rows are provided per memory part (for example x1, y1). These correspond to eight connection bit rate classes and eight transmission bit rate classes. These can be characterized by two different dimensional ranges in view of the peak bit rates, and by four different dimensional ranges in view of the mean bit rates.

Among other things, the functioning of the processor also covers the write-in of the significations into the individual storage cells of the storage cell rows for each of the ATM links. Proceeding from the actual load condition on an ATM link, the transmission capacity that is still respectively free and available for new virtual connections is identified for this purpose. The storage cell for the respective ATM link is then signified in those storage cell rows that correspond to transmission bit rate classes having the identified transmission capacity as well as lower transmission capacity, and that are allocated to transmission bit rate limit values corresponding thereto. When, for example, the transmission capacity that is still free on the ATM link z112 is identified, then the write means P1—in conjunction therewith—is first set to the memory part (x1) to which the ATM link z112 is allocated. When the transmission capacity that is still free, i.e. that is still available for new virtual connections with respect to the ATM link z112 has been identified, then the write means P1 enters logical zeros in part, and logical ones, in part, into the column 112 corresponding to this ATM link z112. Logical ones are thus written into the storage cells of all of those storage cell rows for which adequate transmission capacity is still present and available on the ATM link z112. This shall be set forth in somewhat greater detail later.

In a further memory area for every ATM link and with respect to all connections established thereover, the processor forms and stores, first, the sum of the mean bit rates of these connections, and second, a product sum wherein the individual products are respectively formed from the mean bit rate and the difference between the peak bit rate and the mean bit rate of one of the virtual connections, i.e. the products are formed in call-associated fashion. For example, this special memory area can be a component part of a column, for example 112, in a memory part, for example x1. This special memory area will thus be allocated to the ATM link z112.

The processor P forms the sum as well as the product sum anew when setting up a new virtual connection as well as when clearing down a virtual connection that had been set up. This can occur in such fashion that the mean bit rate of the virtual connection that respectively changes the occupation situation, and the product corresponding to this virtual connection, are employed for incrementing or for decreasing the sum as well as the product sum, i.e. bringing them to the respective current status.

As was already stated, the central processor determines whether at least one new virtual connection of the connection bit rate class corresponding to the respective transmission bit rate class can be set up. This is determined for each ATM link based upon the mean bit rates and the peak bit rates of the virtual connections already set up via this link and proceeding from the mean bit rate and peak bit rate of each and every one of the transmission bit rate classes. In terms of time, these calculating operations are implemented by the processor following the route-searching procedures. The route-searching procedures are thus far less critical in terms of their chronological urgency, and are also simplified, since they are reduced to simple one-bit comparison events. In particular, however, this also has an extremely positive influence with respect thereto, since the calculating events can be limited to those ATM links which are now directly affected by the set-up or clear-down of a virtual connection.

For every ATM link where something with respect to the occupation situation has changed (i.e. not only when setting up a new virtual connection but in the analogously corresponding fashion at every clear-down thereof as well), the processor thus successively calculates the possibilities for virtual connections in the various bit rate classes. This is based on the mean bit rate and on the peak bit rate of each of the virtual connections already set up via this ATM link. The sum and product sum that are already formed are preferably used for this purpose. Proceeding on the basis of the mean bit rate and peak rate of each and every one of the possible transmission bit rate classes, the processor calculates whether at least one new respective virtual connection of the bit rate class corresponding to the respective transmission bit rate class can still be set up in view of the transmission capacity that is still available. Both the product sum as well as the sum of the mean bit rates for the virtual connections that are already set up are utilized for this purpose, and the corresponding product and the corresponding mean bit rate for a virtual connection of one of the various bit rate classes are also added to the product sum and to the sum of the mean bit rates. The processor thus forms a product sum as well as a sum of the mean bit rates for the virtual connections that are already set up as well as for a virtual connection of one of the various bit rate classes. The processor sequences this per bit rate class. From the product sum acquired in this way, it then forms a square root value and multiplies the latter by an enlargement factor. It then adds the sum of the mean bit rates thereto and thus forms a comparison value which is the result of this addition. When this comparison value then does not exceed the maximum transmission bit rate of the ATM link coming into consideration, this ATM link is signified in the storage row corresponding to the respective transmission bit rate class, i.e. a logical one is written in. Otherwise, a logical zero is written in.

Let the comparator V also be pointed out. This serves for the implementation of the coincidence check that has already been set forth. A determination that links corresponding to one another are coincidentally signified is thus made with the assistance of this comparator V.

European Patent Application 90122430.3 has already been referenced. Among the things disclosed therein is that the comparison event set forth can also be modified. This, of course, is also true given application of the contents of this earlier application to the case of the present invention. Thus, it is also possible that the processor makes the comparison value even somewhat more precise. It is accordingly provided that it selects the highest peak bit rate from the peak bit rates of the virtual connections already set up via the respective ATM link, and also adds the amount thereof to the comparison value and only then implements the described comparison.

An enlargement factor was mentioned above and this shall be set forth in somewhat greater detail below. There is a high degree of probability that the case will not occur that bit rates that are so extensive that the transmission capacity of an ATM line is exceeded occur on an ATM line during practical operation. Let it be assumed that a probability of $10^{-9}$ is demanded. The size of the enlargement factor essentially results from this exponent ($-9$). Given a probability of $10^{-9}$ through $10^{-10}$ (with which thus a loss of cells occurs), this amounts to approximately 8 to 9. The boundary conditions are that a) an ATM line is operated with a gross transmission capacity of approximately 150 Mbit/s ("gross" means including header of the ATM cells), b) the peak bit rates of the virtual connections that are conducted via this ATM line do not exceed 2 Mbit/s, and c) the ratio of mean bit rate to peak bit rate in each of the connections lies between 0.1 and 0.9.

In conclusion, let it also be pointed out that the above-described switching equipment can also be modified in the following way. First, a plurality of ATM link occupation memories corresponding in number to the plurality of ATM link groups can be provided, instead of one ATM link occupation memory (route-searching memory) for the ATM link groups, this plurality of ATM link occupation memories being drivable in parallel in the above-described route search. Second, the above-described functions of the route-searching means L can also be executed by the processor P.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for setting up virtual connections in ATM switching equipment operating according to an asynchronous transfer mode, comprising the steps of:

providing a multi-stage ATM switching matrix network having a plurality of switching matrix stages each having a plurality of ATM switching elements, and wherein ATM links lead from switching matrix stage to switching matrix stage, and with the ATM switching elements connecting successive switching matrix stages to one another;

defining and storing bit rate limit values in call-associated fashion for individual virtual connections;

providing an ATM link occupation memory for set-up of new virtual connections by selecting associated routes, free bit rate transmission capacities which are still available being individually stored therein for the ATM links;

checking acceptability of the set-up of new virtual connections with respect to each and every one of the ATM links coming into consideration for these connections by use of the bit rate limit values defined for the new virtual connections and by use of the free bit rate transmission capacity that is still respectively available on the corresponding ATM links;

allocating the virtual connections to connection bit rate classes referring to dimensional ranges of the bit rate limit values, and allocating the free bit rate transmission capacities still respectively available on the ATM links to transmission bit rate classes having corresponding transmission bit rate limit values;

combining into an ATM link group ATM links respectively exiting from one of the ATM switching elements and/or leading to such an ATM switching element;

reserving in the ATM link occupation memory means to each of the ATM link groups a family of storage cells each having a respective plurality of storage locations, each of the storage cells being allocated to a defined connection or transmission bit rate class, and within the respective storage cell each of the storage locations being allocated to one of the ATM links connected to the respective ATM switching element;

marking in binary fashion the individual storage locations of a storage cell given a presence of a free transmission capacity on the allocated ATM link for the transmission bit rate class allocated to the respective storage cell;

for setting up a new virtual connection via a plurality of ATM links corresponding in number to the plurality of switching matrix stages, selecting for every one of the ATM link groups coming into consideration a storage cell corresponding to the connection bit rate class allocated to the new virtual connection;

interrogating the individual storage locations identically defined with respect to the sequence within the storage cells just being driven; and based on the interrogating, selecting for the new virtual connection those ATM links whose allocated storage locations have a coincidency with respect to their binary identification.

2. A method according to claim 1 wherein said bit rate limit values for the individual, virtual connections comprise mean bit rate values.

3. A method according to claim 2 wherein connection bit rate classes or transmission bit rate classes are formed that differ from one another on the basis of different mean bit rates.

4. A method according to claim 1 wherein said bit rate limit values for the individual, virtual connections comprise peak bit rate values.

5. A method according to claim 4 wherein connection bit rate classes or transmission bit rate classes are formed that differ from one another on the basis of different peak bit rates.

6. A method for setting up virtual connections in ATM switching equipment operating according to an asynchronous transfer mode, comprising the steps of:

providing a multi-stage ATM switching matrix network having a plurality of switching matrix stages each having a plurality of ATM switching elements, and wherein ATM links lead from switching matrix stage to switching matrix stage, and with the ATM switching elements connecting successive switching matrix stages to one another;

defining and storing bit rate limit values in call-associated fashion for individual virtual connections;

providing an ATM link occupation memory for set-up of new virtual connections by selecting associated routes, free bit rate transmission capacities which are still available being individually stored therein for the ATM links;

checking acceptability of the set-up of new virtual connections with respect to each and every one of the ATM links coming into consideration for these connections by use of the bit rate limit values defined for the new virtual connections and by use of the free bit rate transmission capacity that is still respectively available on the corresponding ATM links;

allocating the virtual connections to connection bit rate classes referring to dimensional ranges of the bit rate limit values, and allocating the free bit rate transmission capacities still respectively available on the ATM links to transmission bit rate classes having corresponding transmission bit rate limit values;

combining into an ATM link group ATM links respectively exiting from one of the ATM switching elements and/or leading to such an ATM switching element;

reserving in the ATM link occupation memory means for each of the ATM link groups a family of storage cells each having a respective plurality of storage locations, each of the storage cells being allocated to a defined connection or transmission bit rate class, and within the respective storage cell each of the storage locations being allocated to one of the ATM links connected to the respective ATM switching element;

marking in binary fashion the individual storage locations of a storage cell given a presence of a free transmission capacity on the allocated ATM link for the transmission bit rate class allocated to the respective storage cell;

setting up a new virtual connection via a plurality of ATM links corresponding in number to the plurality of switching matrix stages by selecting for every one of the ATM link groups coming into consideration a storage cell corresponding to the connection bit rate class allocated to the new virtual connection;

interrogating the individual storage locations identically defined with respect to the sequence within the storage cells just being driven;

based on the interrogating, selecting for the new virtual connection those ATM links whose allocated storage locations have a coincidency with respect to their binary identification;

proceeding from a momentary actual load condition and at every set-up of a virtual connection or cleardown of an existing virtual connection on the ATM links coming into consideration, updating the free transmission capacity that is still respectively available for new virtual connections for the individual transmission bit rate classes by forming a transmission bit rate value for each of the ATM links based on at lease one of mean bit rates or peak bit rates of all virtual connections already set up via the respective ATM link and based on at least one of a mean bit rate or peak bit rate corresponding to the respective transmission bit rate class; and when the calculated transmission bit rate value is lower than or equal to a maximum transmission bit rate defined for the respective ATM link, identifying in binary fashion the storage location corresponding to the respective ATM link in the storage cells allocated to the respective transmission bit rate class and to the transmission bit rate classes that are lower in comparison thereto.

7. A method according to claim 6 including the steps of:

for calculating the transmission bit rate value for the respective ATM link and at every set-up or cleardown of a virtual connection, updating a sum of the mean bit rates of all virtual connections set up thereover, and updating a product sum, and forming individual products deriving from the mean bit rate and a difference between the peak bit rate and the mean bit rate of one of the set-up, virtual connections;

expanding a corresponding sum or product sum by the mean bit rate or by a product of a virtual connection corresponding to the transmission bit rate classes, said product corresponding to the products contained in the product sum; and adding a square root value of the expanded product sum multiplied by a magnification factor to the expanded sum of the mean bit rates.

* * * * *